Patented May 3, 1949

2,468,881

UNITED STATES PATENT OFFICE 2,468,881

MANUFACTURE OF 3-TETRAHYDRO-FURANONE

Alan Woodworth Johnson, Blackley, Manchester, England, assignor to Imperial Chemical Industries Limited, a corporation of Great Britain No Drawing. Application August 19, 1946, Serial No. 691,651. In Great Britain August 31, 1945

3 Claims. (Cl. 260—345)

This invention relates to the manufacture of 3-tetrahydrofuranone which is a substance not hitherto known.

According to the invention we make 3-tetrahydrofuranone by treating 2-butine-1:4-diol with the mercury salt of an amide.

The mercury salt may be a salt of a carboxylic acid amide or of a sulphonic acid amide. Thus there may be used for example mercury p-toluenesulphonamide or mercury acetamide.

The process of the invention is preferably carried out in a solvent. Suitable solvents include for example methyl alcohol and ethyl alcohol.

Preferably the 2-butine-1:4-diol and the mercury salt of the amide are heated together in the chosen solvent.

The 3-tetrahydrofuranone is isolated by conventional methods. It is a substance useful as a reducing agent and as an intermediate in the manufacture of dyestuffs and medicinal substances.

The invention is illustrated but not limited by the following examples in which parts are by weight:

Example 1

100 parts of 2-butine-1:4-diol, 50 parts of mercury p-toluenesulphonamide (made as described by Goldberg, Aeschbacher and Hardegger, Helv. chim. Acta, 1943, 26, 680) and 1200 parts of absolute ethanol are stirred and heated together under reflux during 72 hours. The mixture is then filtered and the ethanol is removed from the filtrate by distillation. The residue is then fractionally distilled under reduced pressure and 3-tetrahydrofuranone is obtained as a colourless liquid of boiling point 92–94° C./15 mm. The 2:4-dinitrophenylhydrazone thereof is yellow and has melting point 113–115° C.

Example 2

1.5 parts of 2-butine-1:4-diol, 4 parts of mercury acetamide and 40 parts of methanol are heated under reflux during 48 hours. The mixture is then treated as described in Example 1 and 3-tetrahydrofuranone is obtained.

I claim:

1. Process for the manufacture of 3-tetrahydrofuranone which comprises heating 2-butine-1,4-diol with a mercury salt of an amide at the reflux temperature of the reaction mixture in the substantial absence of water.

2. Process for the manufacture of 3-tetrahydrofuranone which comprises heating 2-butine-1,4-diol with mercury acetamide in a reaction medium consisting of said diol, said mercury acetamide and an alcohol from the group consisting of methanol and ethanol at the reflux temperature of said medium.

3. Process for the manufacture of 3-tetrahydrofuranone which comprises heating 2-butine-1,4-diol with mercury p-toluenesulfonamide in a reaction medium consisting of said diol, said mercury p-toluenesulfonamide and an alcohol from the group consisting of methanol and ethanol at the reflux temperature of said medium.

ALAN WOODWORTH JOHNSON.

REFERENCES CITED

The following references are of record in the file of this patent:

Chem. Abstracts, vol. 22, page 3890, lines 33 and 34.

Alles, J. Pharm. and Exp. Ther., vol. 72, 1941, page 265.

DuPont, Chemical Abstracts, vol. 5, pages 3408 and 3409 (1911).

Goldberg et al., Chemical Abstracts, vol. 38, page 1514.

Heilbron, Dictionary of Organic Compounds, vol. III, page 693.

Chemical Abstracts, vol. 9, page 2232.

Karrer et al., Helv. Chim. Acta, vol. 27, page 117.